(12) United States Patent
Markoski et al.

(10) Patent No.: US 7,205,064 B2
(45) Date of Patent: Apr. 17, 2007

(54) EMULSIONS FOR FUEL CELLS

(75) Inventors: Larry J. Markoski, Champaign, IL (US); Piotr Waszczuk, St. Paul, MN (US); Paul J. A. Kenis, Champaign, IL (US); Eric R. Choban, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 592 days.

(21) Appl. No.: 10/608,815

(22) Filed: Jun. 27, 2003

(65) Prior Publication Data

US 2004/0265681 A1 Dec. 30, 2004

(51) Int. Cl.
*H01M 8/08* (2006.01)

(52) U.S. Cl. .......................................... 429/46; 429/40

(58) Field of Classification Search .................. 429/46
See application file for complete search history.

(56) References Cited

U.S. PATENT DOCUMENTS

| | | | |
|---|---|---|---|
| 5,185,218 A * | 2/1993 | Brokman et al. | 429/27 |
| 6,054,427 A | 4/2000 | Winslow | |
| 6,242,123 B1 | 6/2001 | Nezu et al. | |
| 6,432,918 B1 | 8/2002 | Winslow | |
| 6,437,011 B2 | 8/2002 | Steck et al. | |
| 2004/0058217 A1 * | 3/2004 | Ohlsen et al. | 429/34 |

OTHER PUBLICATIONS

Dupont Zonyl FS-62 technical data sheet (Mar. 2001) (provided by the applicant).*
Delphion search conducted Oct. 23, 2002, for U.S. patents containing "perfluorocarbon" and "fuel cell" in the claims, 1 page.
Delphion search conducted Oct. 23, 2002, for U.S. patents containing "fuel cell and oxygen carrier" and "perfluror*", 1 page.
Delphion search conducted Aug. 23, 2002, for U.S. patents and applications containing "perfluoro*" and "ballard", 1 page.
Delphion search conducted Aug. 23, 2002, for U.S. patents containing "perflurocarbons", 2 pages.
Davis, "NISTIR 6848, Proposed Testing Methodology and Laboratory Facilities for Evaluating Residential Fuel Cell Systems," NIST, 2002, 14 pages.
DUPONT Zonyl FS-62, Fluorosurfactant Information Sheet, 2001, 2 pages.
Riess et al., "Solubility and Transport Phenomena in Perfluorochemicals Relevant to Blood Substitution and Other Biomedical Applications," Pure & Appl. Chem., 1982, pp. 2383-2406, vol. 54.
Wesseler et al., "The Solubility of Oxygen in Highly Fluorinated Liquids," J. Fluorine Chem., pp. 137-146, vol. 9.

(Continued)

*Primary Examiner*—Patrick Joseph Ryan
*Assistant Examiner*—Cynthia Lee
(74) *Attorney, Agent, or Firm*—Evan Law Group LLC

(57) ABSTRACT

A method for transporting a gas to an electrode in a fuel cell is provided, whereby the gas is dissolved in an emulsion comprising a fluorinated hydrocarbon, a surfactant and an aqueous electrolyte with a pH of at most 4 or at least 9, and the emulsion is contacted with the electrode.

23 Claims, 7 Drawing Sheets

OTHER PUBLICATIONS

Choban, E.R., et al., "Microfluidic fuel cells that lack a PEM"., Proceedings of the Annual Power Sources Conference, vol. 40, pp. 317-320, (2002).

Gang, X., et al., "Electrolyte additives for phosphoric acid fuel cells"., Journal of the Electrochemical Society., vol. 140, No. 4, pp. 896-902, (1993).

International Search Report dated Dec. 13, 2005 for corresponding PCT application No. PCT/US2004/020342.

Kronberger, H., et al., "Reduction of oxygen from electrolyte emulsions with high oxygen contents"., Journal of Power Sources, vol. 86, pp. 562-567, (2000).

* cited by examiner

EMULSIONS FOR FUEL CELLS

BACKGROUND

In typical proton exchange membrane (PEM) fuel cells, a proton conducting membrane is sandwiched between the anode and cathode and is often called a membrane electrode assembly (MEA). The membrane serves multiple purposes. It acts as an insulator for electron conduction, while conducting positive and negative charges. It also provides a solid support for the catalytic layers and separates the fuel from the oxidant feed, so that mixing or crossover does not take place.

The fuel may be delivered to the electrode in the gaseous form, for example molecular hydrogen, or liquid form, for instance methanol or formic acid dissolved in water. Oxygen, however, typically enters the cell in gaseous form, as a component of air or as pure oxygen. Due to the chemical nature of the membrane, this gives rise to logistical problems that lower cell performance. When both the fuel and the oxidant feeds are gaseous, the gasses need to be humidified so as not to dry out the PEM. If the PEM dries out, the cell performance drops considerably. In addition, the PEM needs to be kept at low temperatures, whereas the catalyst at the cathode and anode perform best at high temperatures. A cooling apparatus for the membrane is thus often needed.

Problems arise with liquid fuels as well. For instance, when methanol is introduced as an aqueous based fuel, the membrane is slightly permeable to it and crossover of the fuel to the cathode takes place. The crossover causes consumption of fuel at the cathode without production of electricity, and results in a mixed potential at the cathode, causing a considerable drop in potential.

Laminar flow fuel cells avoid the need for a PEM. In this type of cell, parallel laminar flow between two streams of liquid creates an interface between the streams, which replaces the PEM or salt bridge of conventional devices. When the first stream, containing an oxidizer, comes into contact with the first electrode, and the second stream, containing the fuel, comes into contact with the second electrode, a current is produced, while charge migration from the anode to the cathode occurs through the interface. This cell design minimizes crossover by maximizing consumption of the fuel before it diffuses into the oxidant stream.

However, in laminar flow fuel cells both fuel and oxidant are delivered in liquid form, and both the fuel and oxidant fluids must be proton conductive. This limits the applicability of oxygen as the oxidant, because this gas is characterized by a low solubility in water and aqueous solutions of electrolytes.

SUMMARY

In a first aspect, the invention provides a method for transporting gas, whereby the gas is dissolved in an emulsion comprising a fluorinated hydrocarbon, a surfactant and an aqueous electrolyte with a pH of at most 4 or at least 9. The emulsion then comes into contact with an electrode.

In a second aspect, the invention provides emulsions for delivering gas and ions to an electrode, comprising a fluorinated hydrocarbon, a surfactant, and an aqueous electrolyte with a pH of at most 4 or at least 9.

In a third aspect, the invention provides a fuel cell for the generation of electricity, comprising an anode and a cathode wherein at least one of the anode and the cathode is in contact with an emulsion comprising a fluorinated solvent, a surfactant and an aqueous electrolyte with a pH of at most 4 or at least 9.

DETAILED DESCRIPTION

Figure 1:
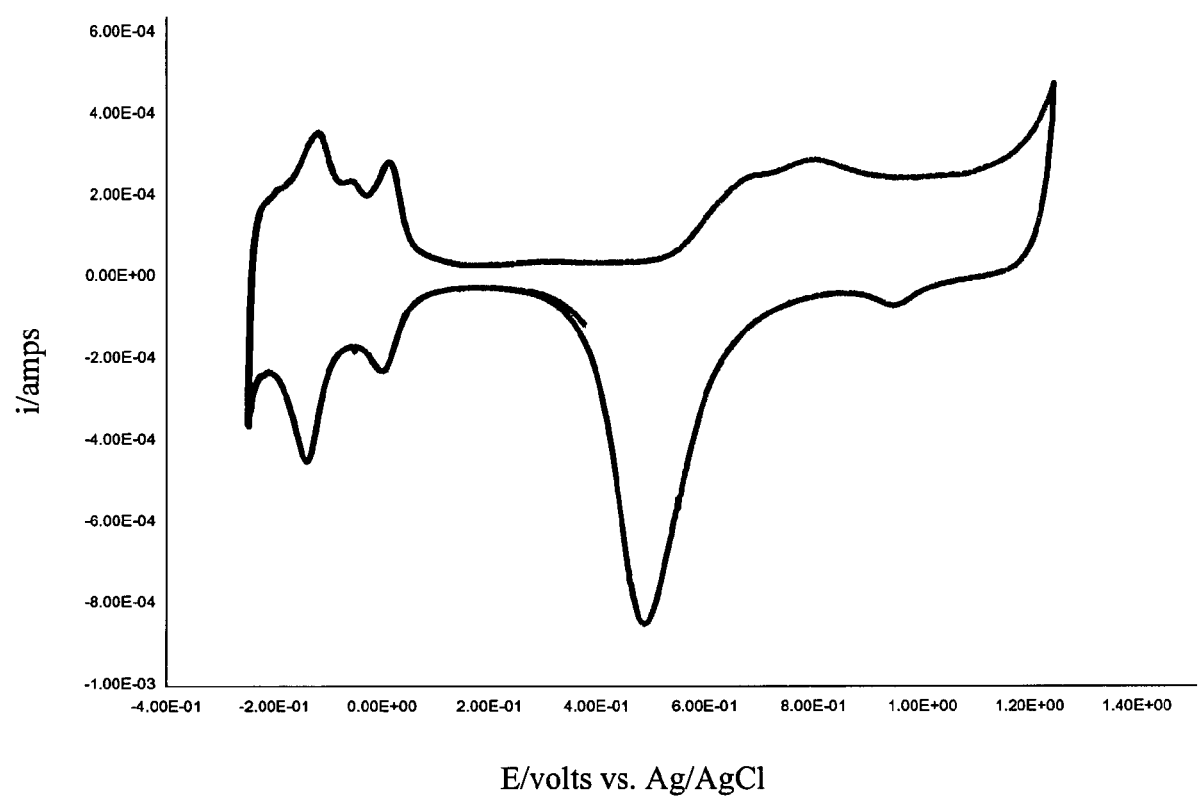
FIG. 1 depicts the cyclic voltamogram of Example 1.

The performance of both PEM and laminar flow cells would benefit from transporting oxygen to the cathode with a fluid having a very low affinity for the fuel and a high affinity for oxygen and carbon dioxide. In a PEM cell, crossover could be minimized, while the fluid would remove heat from the cathode in a more efficient fashion than a gaseous stream. In a laminar flow cell, oxygen dissolved in the liquid could be used as the oxidant at high concentrations, while fuel crossover could be further reduced.

Fluorinated solvents, such as fluorinated hydrocarbons (viz., perfluorinated fluids such as perfluorodecalin available from F2 Chemicals Ltd., Preston, UK) have a very high affinity for oxygen and carbon dioxide and have been successfully used in respiration-type fluids for medicinal applications, such as artificial blood (Clark et al., Journal of Fluorine Chemistry, Vol. 9, pp. 137–146, 1977). However, fluorinated solvents by themselves would not be good choices as they are very strong insulators with a low dielectric constant and not good at charge separation or ionic conduction.

The present invention provides for liquid-phase delivery and removal of a gas to an electrode, and in particular of oxygen to the cathode of a fuel cell, and $CO_2$ from its anode, by making use of fluorinated solvent emulsions. These fluids are also proton conductive and maintain the flow of positive charges to the cathode, or $OH^-$ conductive and maintain the flow of negative charges to the anode. Furthermore, they are usually inert to electrocatalysts, and have a high capacity for carbon dioxide. Fuel crossover is also minimized, and the cooling effect exerted by these emulsion reduces the need for active cooling.

The invention includes emulsions of fluorinated solvents in aqueous electrolytes, the compositions including a fluorinated solvent, an aqueous electrolyte and a surfactant. These emulsions combine the gas transporting capabilities of fluorinated hydrocarbons with the charge conductivity of aqueous electrolytes. Alternatively, the aqueous phase may be emulsified in the fluorinated solvents, yielding a reverse phase micellar structure, where the fluorinated solvent is the continuous phase.

Fluorinated solvents, including hydrochlorofluorocarbons, perfluorocarbons, hydrofluorocarbons, hydrofluoroethers, hydrofluoroesters, and fluorosylanes, are characterized by a low chemical reactivity and a high affinity for oxygen. Preferred fluorinated solvents include: $(C_nF_{2n+1})Si(OCH_3)_3$; $(C_nF_{2n+1})_2Si(OCH_3)_2$; $(C_nF_{2n+1})CH_2OC(O)CH_3$; $CF_3[OCF_2CF_2]_nOCF_3$; $CF_3[OCF_2CF_2]_nOCF_2Cl$; $CF_3[OCF_2CF_2]_nOCF_2Br$; $CF_3[OCF_2CF_2]_nCF_2H$; $CF_3[OCF_2CF_2]_nF$; $CF_3[OCF_2CF_2]_nCl$; $CF_3[OCF_2CF_2]_nBr$; $CF_3$

[OCF$_2$CF$_2$]$_n$H; CF$_3$CF$_2$[OCF$_2$CF$_2$]$_n$F; CF$_3$CF$_2$[OCF$_2$]$_n$Cl; CF$_3$CF$_2$[OCF$_2$CF$_2$]$_n$Br; CF$_3$CF$_2$[OCF$_2$CF$_2$]$_n$H; CF$_3$CHF [OCF$_2$CF$_2$]$_n$F; CF$_3$CHF[OCH$_2$CF$_2$]$_n$Cl; CF$_3$CHF [OCF$_2$CF$_2$]$_n$Br; CF$_3$CHF[OCF$_2$CF$_2$]$_n$H; CF$_3$CHF [OCF$_2$CF(CF$_3$)]$_n$F; (CF$_3$)$_2$CF(CF$_2$)$_n$F; (CF$_3$)$_2$CF(CF$_2$)$_n$Cl; (CF$_3$)$_2$CFO(CF$_2$)$_n$Br; (CF$_3$)$_2$CFO(CF$_2$)$_n$H; (CF$_3$)$_2$CFO (CF$_2$)$_n$F; (CF$_3$)$_2$CFO(CF$_2$)$_n$Cl; (CF$_3$)$_2$CFO(CF$_2$)$_n$Br; (CF$_3$)$_2$ CFO(CF$_2$)$_n$H; C$_n$F$_{2n+2}$; CF$_3$(CF$_2$)$_n$Cl; CF$_3$(CF$_2$)$_n$HCF$_3$ (CF$_2$)$_n$Br; N(C$_n$F$_{2n+1}$)$_3$ wherein n is 1 to 20; C$_6$F$_m$H$_{6-m}$, C$_6$F$_m$Cl$_{6-m}$, C$_6$F$_m$Br$_{6-m}$, C$_6$F$_m$(CF$_3$)$_{6-m}$, wherein m is 1 to 6; and mixtures thereof.

Particularly preferred fluorinated solvents include: CF$_3$ (CF$_2$)$_7$Br; (CF$_3$)$_2$CF(CF$_2$)$_4$Cl; (CF$_3$)$_2$CFO(CF$_2$)$_6$F; perfluorobutyltetrahydrofuran; perfluoropropyltetrahydropyran; C$_8$F$_{18}$; CF$_3$CFBrCF$_2$Br; (CF$_3$)$_2$CF(CF$_2$)$_4$Br; [(CF$_3$)$_2$ CFOCF$_2$CF$_2$]$_2$; C$_9$F$_{20}$; C$_6$F$_6$; CF$_3$CHF[OCF$_2$CF(CF$_3$)]$_3$F; (CF$_3$)$_2$CF(CF$_2$)$_6$Cl; C$_{10}$F$_{16}$; CF$_3$CHF[OCF$_2$CF(CF$_{3)}$]$_4$F; perfluorotetrahydrodicyclopentadiene; [(CF$_3$)$_2$CFO (CF$_2$)$_4$]$_2$; perfluorodecalin; CF$_3$CHF[OCF$_2$CF(CF$_3$)]$_5$F; perfluorodimethyladamantane; N(C$_4$F$_9$)$_3$; perfluoromethyldecalin; C$_6$H$_4$(CF$_3$)$_2$; and CF$_3$CHF[OCF$_2$CF(CF$_3$)]$_9$F.

Preferably, the fluorinated solvent is inert to the materials in the fuel cell. For example, when the cathode is platinum, as is the case in most fuel cells, and methanol or formic acid is the fuel, the use of perfluorodecaline (PFD) is particularly indicated. This fluorinated solvent is inert to the catalyst and has minimal affinity for either fuel.

The surfactant emulsifies the fluorinated solvent in the water phase, and is preferably inert to the electrode in order not to cause poisoning. Thus, compatibility between surfactant and electrode should be determined. A simple test for this determination is as follows: a first cyclic voltamogram is run on the electrode in a test solution, followed by a second voltamogram in the same solution with a quantity of the surfactant. The occurrence of discrepancies between the former and the latter will reveal electrode poisoning.

Fluorinated surfactants, alone or in combination with non-fluorinated surfactants, are preferred for the emulsification of fluorinated solvents. Preferred fluorinated surfactants include: F(CF$_2$CF$_2$)$_y$(CH$_2$CH$_2$O)$_x$H, wherein y is 1 to 10, and x is 0 to 25; ((F(CF$_2$CF$_2$)$_z$CH$_2$CH$_2$)$_x$P(O)(ONH$_4$)$_y$, wherein x is 1 or 2, y is 1 or 2, x+y is 3, and z is 1 to 8; F(CF$_2$CF$_2$)$_x$CH$_2$CH$_2$SCH$_2$CH$_2$CO$_2$Li, wherein x is 1 to 10; F(CF$_2$CF$_2$)$_x$CH$_2$CH$_2$SO$_3$Y, wherein x is 1 to 10, and Y is H$^+$ or NH$_4{}^+$. Other surfactants may be found in Fluorinated Surfactants, Synthesis, Properties, Applications (Eric Kissa; Marcel Dekker Publisher, 1993). For example, when the fluorinated solvent is PFD, CF$_3$(CF$_2$)$_5$CH$_2$CH$_2$SO$_3$X (X=H or NH$_4$), commercially available as ZONYL® FS-62 (DuPont, Wilmington, Del.) is a particularly preferred surfactant.

The electrolyte enhances charge conductivity of the emulsion, but should not poison the electrode. Also, a high concentration of charges improves the current from the fuel cell. For fuel cells operating in acidic conditions, acidic electrolytes such as solutions of H$_2$SO$_4$, HNO$_3$, HClO$_4$, H$_3$PO$_3$, H$_3$PO$_4$, HCl, HBr, HI, CH$_3$CO$_2$H, CCl$_3$CO$_2$H, CF$_3$CO$_2$H, and mixtures thereof, are preferred. For fuel cells operating in alkaline conditions, alkaline electrolytes such as solutions of LiOH, NaOH, KOH, Rb(OH), CsOH, Mg(OH)$_2$, Ca(OH)$_2$, Sr(OH)$_2$, and Ba(OH)$_2$ are mixtures thereof are preferred.

Additional electrolytes, for example inorganic salts, may be added. When PFD is the fluorinated solvent, and CF$_3$ (CF$_2$)$_5$CH$_2$CH$_2$SO$_3$X (X=H or NH$_4$) the surfactant, H$_2$SO$_4$ is a particularly preferred electrolyte.

Fluorinated solvent: aqueous electrolyte volume-to-volume ratios can vary greatly, since direct and reverse micellar structures can both act as charge conductive oxygen carriers. Preferred ratios range from 1:24 to 24:1, more preferably 3:24 to 12:24, yet more preferably 1:6 to 5:7, and most preferably from 2:9 to 4:9. The preferred amount of surfactant may vary from 0.07% to 3% by weight of the total weight of the emulsion, more preferably 0.125% to 2%, and most preferably 0.5% to 1%.

Figure 6:
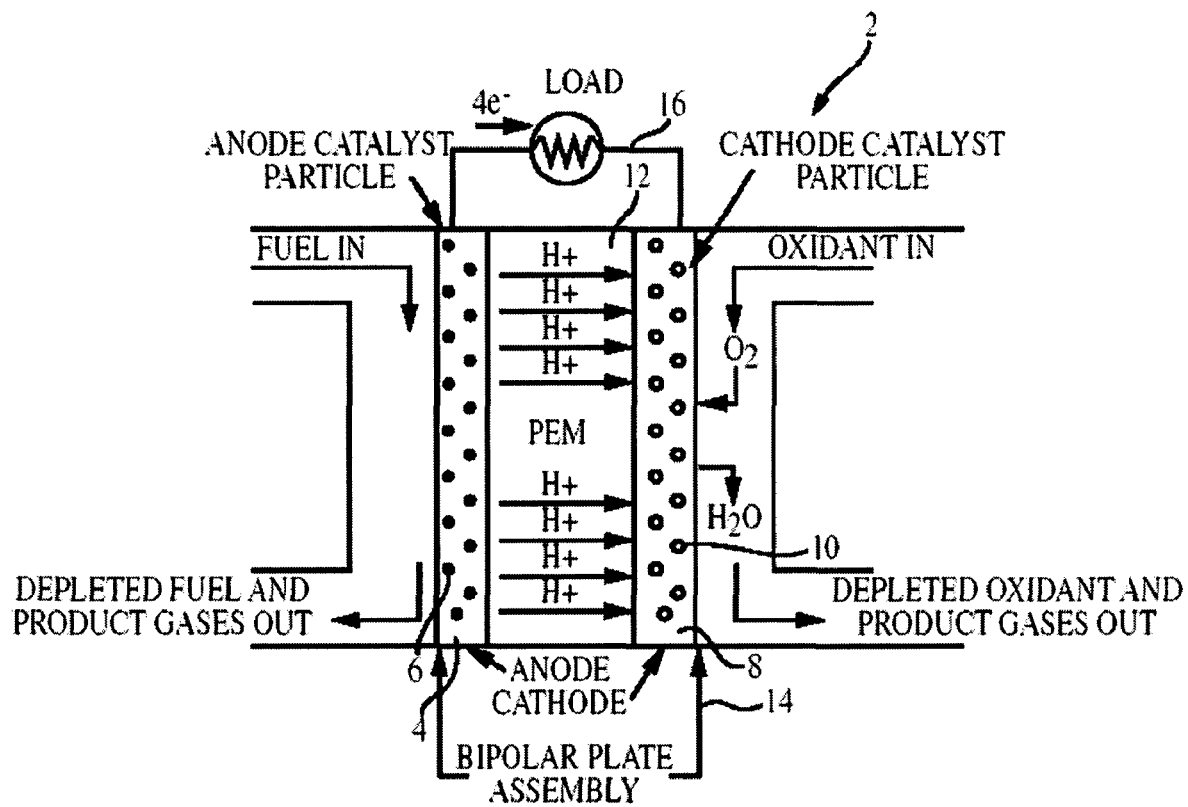
FIG. 6 shows a cross-sectional schematic illustration of a PEM fuel cell.

FIG. 6 shows a cross-sectional schematic illustration of a (PEM) fuel cell 2. Fuel cell 2 includes a high surface area anode 4 that acts as a conductor, an anode catalyst 6 (typically platinum alloy), a high surface area cathode 8 that acts as a conductor, a cathode catalyst 10 (typically platinum), and a PEM 12 that serves as a solid electrolyte for the cell. The PEM 12 physically separates anode 4 and cathode 8. Fuel in the gas and/or liquid phase is brought over the anode catalyst 6 where it is oxidized to produce protons and electrons in the case of hydrogen fuel, and protons, electrons, and carbon dioxide in the case of an alcohol fuel. The electrons flow through an external circuit 16 to the cathode 8 where air, oxygen, or another is being constantly fed. Protons produced at the anode 4 selectively diffuse through PEM 12 to cathode 8, where oxygen is reduced in the presence of protons and electrons at cathode catalyst 10 to produce water.

Figure 7:
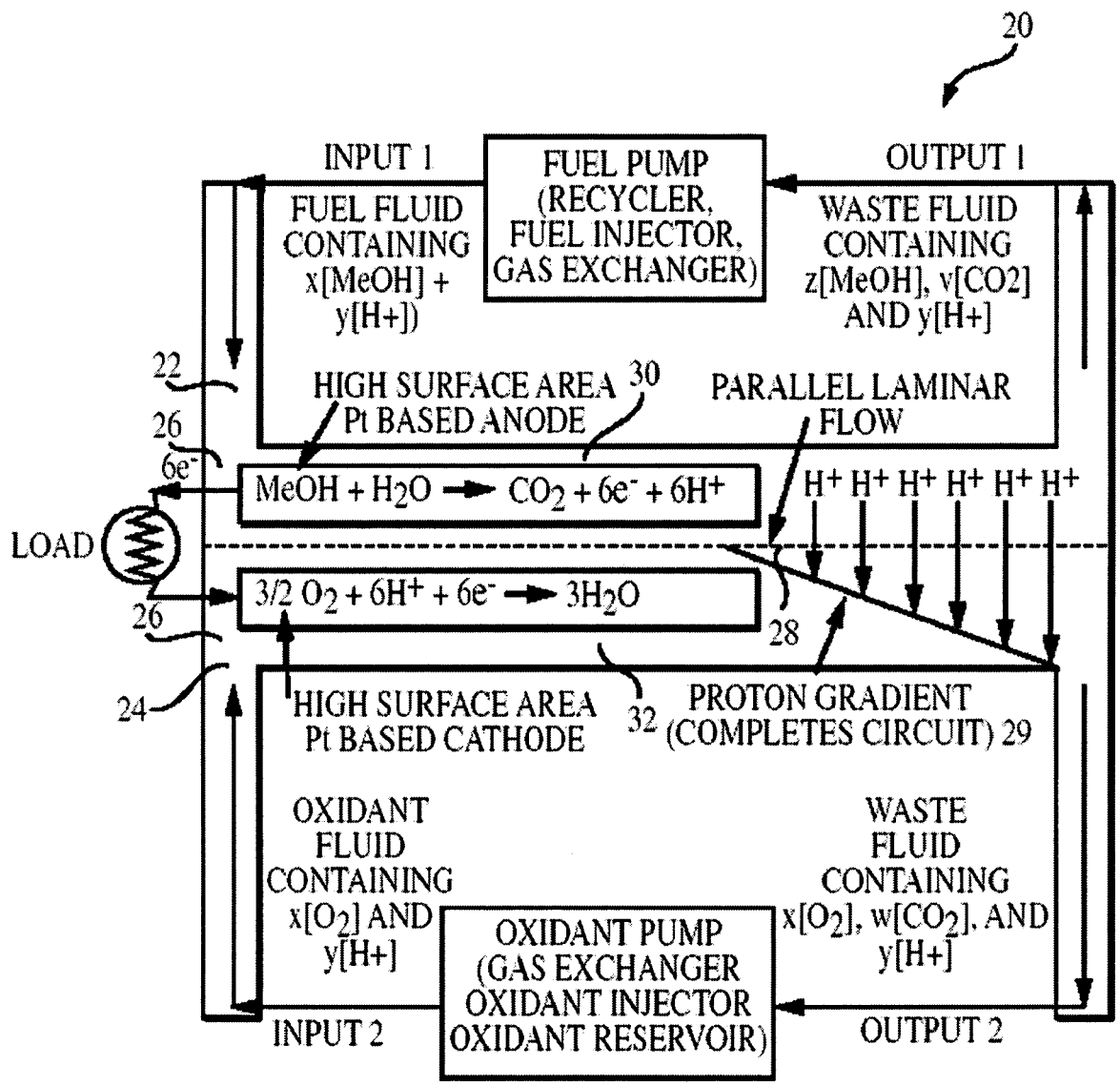
FIG. 7 shows a cross-sectional schematic illustration of a laminar flow fuel cell.

In the laminar flow cell 20, as seen in FIG. 7, both the fuel input 22 (for example an aqueous solution containing MeOH) and the oxidant input 24, a solution containing oxygen dissolved in one of the emulsions of the invention and a proton source, are in liquid form. By pumping the two solutions into the channel 26, parallel laminar flow induces the interface 28 that is maintained during fluid flow. Rapid proton diffusion 29 completes the circuit of the cell as protons are produced at the anode 30 and consumed at the cathode 32. In this case, the interface 28 prevents the two solutions from mixing and allows rapid proton conduction to complete the circuit. In addition, methanol crossover is minimized by the very low affinity of the emulsion of the invention for methanol. If fuel crossover into the emulsion occurs, the emulsion is recovered, the fuel is separated and the solution may be re-circulated in the cell. Furthermore, since both liquids are excellent heat exchangers, an external cooling system is not required.

The fluids may also be used to deliver oxidant gases other than oxygen, for example N$_2$O and O$_3$. Likewise, the fluid compositions of the invention may also be used to transport fuel gases, for example H$_2$, to the anode.

EXAMPLES

1) Emulsions

PFD was emulsified using a mixture of CF$_3$(CF$_2$)$_5$ CH$_2$CH$_2$SO$_3$H and CF$_3$(CF$_2$)$_5$CH$_2$CH$_2$SO$_3$NH$_4$ (ZONYL® FS-62, DuPont) in aqueous 0.5 M H$_2$SO$_4$ via a ultrasonic homogenizer. The emulsion was prepared at the concentrations of PFD reported in Table 1.

TABLE 1

| Emulsion | Volume 0.5 M H$_2$SO$_4$ solution (mL) | Volume of PFD (mL) | Amount of ZONYL® FS-62 | Volume of PFD emulsified (mL) |
| --- | --- | --- | --- | --- |
| 1A | 30 | 0 | 0 | 0 |
| 2A | 20 | 10 | 5 drops | 3 |
| 3A | 20 | 10 | 5 drops | 10 |

Figure 2:
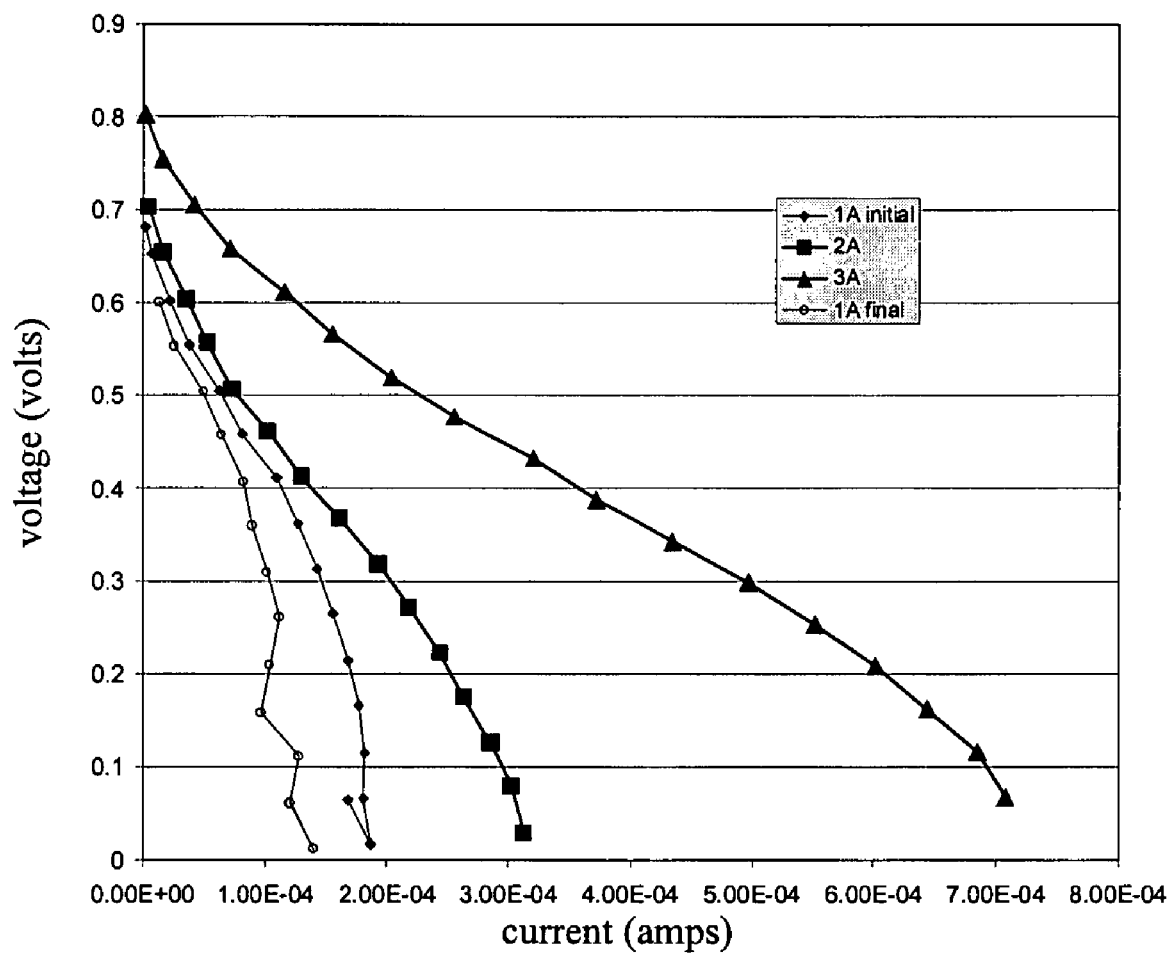
FIG. 2 depicts the current voltage plot of Example 1.

The resulting emulsions were exposed to a Pt catalyst and were found to be inert, as seen in the cyclic voltamogram of FIG. 1. The emulsions were then saturated with oxygen for ½ hour and tested in a laminar flow fuel cell with formic acid as the reductant. As seen in the current voltage plot of FIG. 2, the emulsion with the largest PFD content showed the largest current when compared to aqueous streams that were saturated with oxygen in the same way and introduced in the cell at the same flow rate (0.3 mL/min).

2) Concentration Effects of ZONYL® FS-62 on Emulsions

Emulsion experiments were performed with different concentrations of ZONYL® FS-62 to determine the ability to emulsify and the stability of the emulsion. As can be seen from the results of Table 2, a minimum of 0.25 wt % ZONYL® FS-62 in 20 mL 0.5 M sulfuric acid was needed to emulsify 10 mL (1:3) of PFD under ultrasonication conditions. Higher ZONYL® FS-62 concentrations led to better, and more stable emulsions.

TABLE 2

| Emulsion | Volume 0.5 M $H_2SO_4$ solution (mL) | Volume of PFD (mL) | Amount of ZONYL® FS-62 | Volume of PFD emulsified (mL) | Stability |
| --- | --- | --- | --- | --- | --- |
| 1B | 20 | 10 | 1 wt % | 10 | Weeks |
| 2B | 20 | 10 | 0.5 wt % | 10 | Days |
| 3B | 20 | 10 | 0.25 wt % | 10 | 2–3 days |
| 4B | 20 | 10 | 0.125 wt % | 3–4 | 0 |

3) PFD Concentration Effects on Fuel Cell

Figure 3:
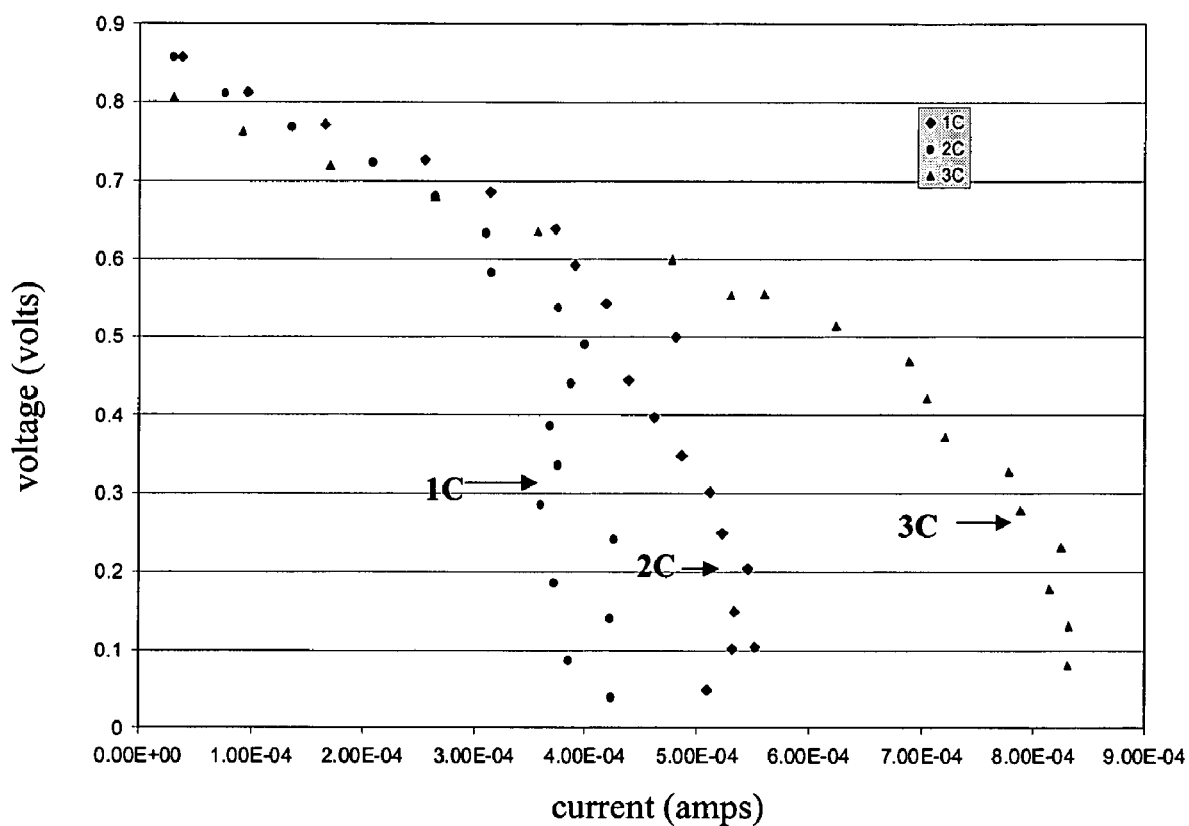
FIG. 3 depicts the current voltage plot of Example 3.

To test the concentration effects of the PFD in the laminar flow fuel cell, the emulsions listed in Table 3 were prepared, saturated with oxygen for ½ hour before being inserted into a laminar flow cell at a flow rate of 0.3 mL/min. As seen in the current voltage plot of FIG. 3, emulsion 3C shows the highest current profile which correlates with it having the highest oxygen content.

TABLE 3

| Emulsion | Volume of 0.25 wt % ZONYL® in 0.5 M $H_2SO_4$ solution (mL) | Volume of PFD (mL) | Stability |
| --- | --- | --- | --- |
| 1C | 27.5 | 2.5 | Week |
| 2C | 25 | 5 | Days |
| 3C | 20 | 10 | 2–3 days |

4) Oxygen Concentration Effects on Fuel Cell.

Figure 4:
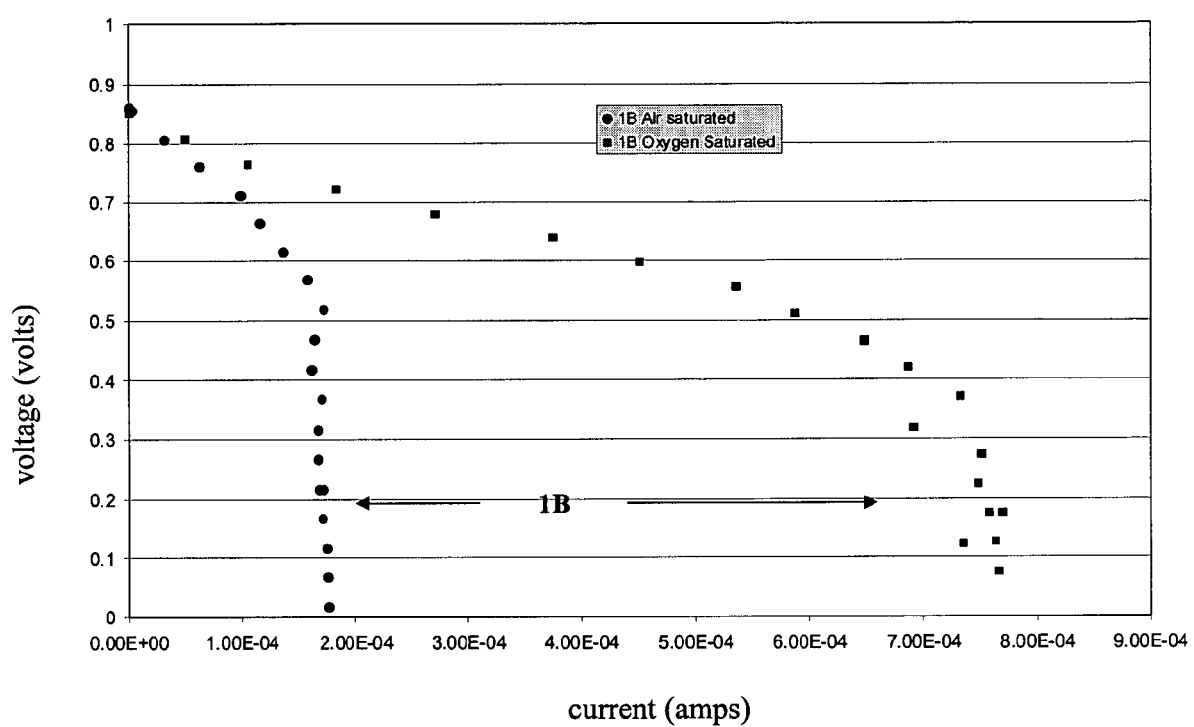
FIG. 4 depicts the current voltage plot of Example 4.

Emulsion 1B was exposed to oxygen in air and run through the laminar flow fuel cell. The same experiment was repeated, this time exposing the emulsion to pure oxygen. As seen in FIG. 4, the increase in oxygen concentration resulted in an increased current output, especially at lower voltages.

5) Limit of Currents Obtainable with the Emulsions.

Figure 5:
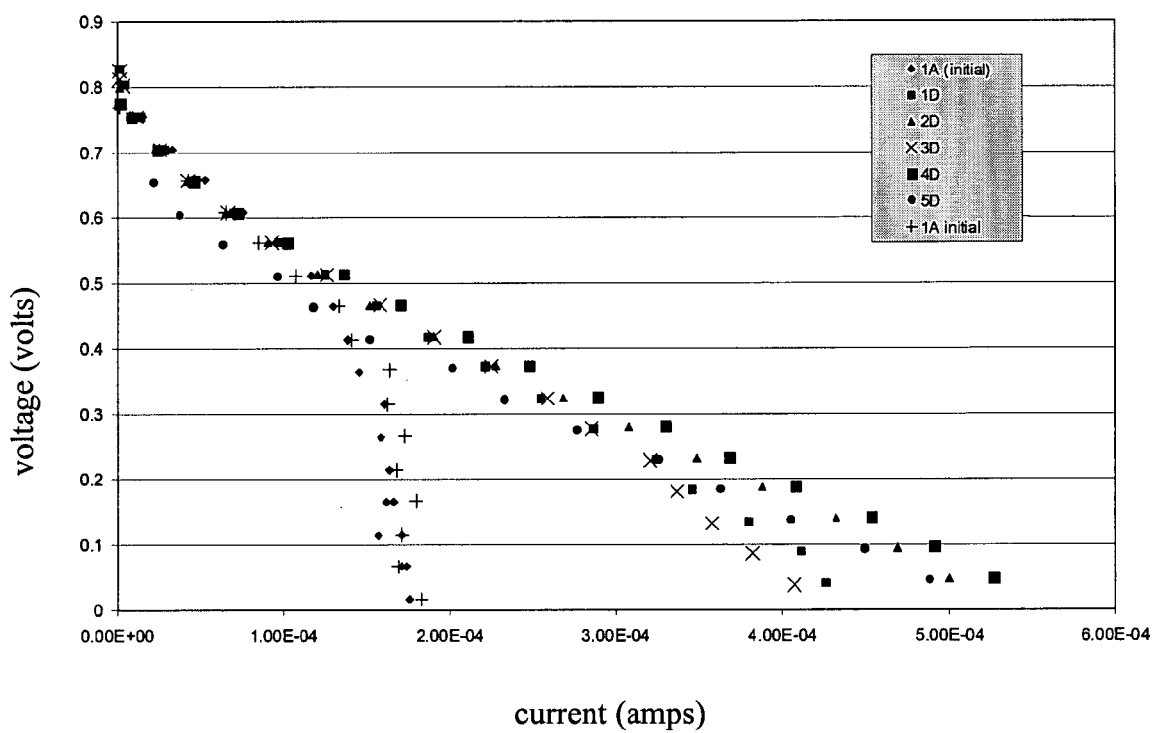
FIG. 5 depicts the current voltage plot of Example 5.

To find the limit of the current that could be reached with the laminar flow fuel cell, another series of emulsions were made with varying amounts of PFD, as can be seen in Table 4. All of these emulsions were stable and are assumed to have a reversed micellar structure at PFD concentrations greater than 50%. All of the emulsions were saturated with pure oxygen for ½ hour and run through a laminar flow fuel cell, as previously done. As seen in FIG. 5, the current for each emulsion followed nearly the same trend, although the oxygen concentration was undoubtedly increasing through the series. One possible explanation may be that some other factor, for example high resistance of the cell, was limiting the current that the cell could produce and the cell performance was no longer related to oxygen concentration. Nevertheless, these experiments proved that reverse micellar structures can also act as both oxygen carriers and proton conductors.

TABLE 4

| Emulsion | Volume of 2 wt % ZONYL in 0.5 M $H_2SO_4$ solution (mL) | Volume of PFD (mL) | Stability |
| --- | --- | --- | --- |
| 1D | 20 | 10 | Week |
| 2D | 17.5 | 12.5 | Week |
| 3D | 15 | 15 | Week |
| 4D | 12.5 | 17.5 | Week |

Other experiments have been performed with the PFC emulsions in conventional fuel cells, and the emulsions have been found to function in much the same way as in the laminar flow fuel cell. They showed no deleterious effect on this type of device, proving that the fluid may be used in conventional PEM based fuel cells as well.

6) Use of PFD-Based Emulsion in a PEM Fuel Cell (Prophetic Example).

In a PEM fuel cell, the anode compartment is filled with a gas transporting emulsion, and $H_2$ is bubbled in the emulsion. Both gas transporting emulsions are obtained by emulsifying 10 ml of PFD in 20 ml of 0.5 M sulfuric acid, with an amount of ZONYL® FS-62 equivalent to 1% of the total weight of the emulsion. The cathode compartment is also filled with a gas transporting emulsion, and $O_2$ is bubbled in the emulsion. The apparatus may also run on a continuous stream of oxidant and fuel solutions, for example in a laminar flow fuel cell.

What is claimed is:

1. A fuel cell for the generation of electricity, comprising:
   a) an anode;
   b) a cathode; and
   c) an emulsion in contact with at least one of the anode and the cathode, the emulsion comprising a fluorinated solvent, a surfactant and an aqueous electrolyte with a pH of at most 4 or at least 9.

2. The fuel cell of claim 1, wherein the aqueous electrolyte has a pH of at most 3.

3. The fuel cell of claim 1, wherein the aqueous electrolyte has a pH of at most 1.

4. The fuel cell of claim 1, wherein the aqueous electrolyte comprises a member selected from the group consisting of: $H_2SO_4$, $HNO_3$, $HClO_4$, $H_3PO_3$, $H_3PO_4$, HCl, HBr, HCl, $CH_3CO_2H$, $CCl_3CO_2H$, $CF_3CO_2H$, and mixtures thereof.

5. The fuel cell of claim 1, wherein the electrolyte comprises an aqueous solution of $H_2SO_4$.

6. The fuel cell of claim 1, wherein the aqueous electrolyte has a pH of at least 10.

7. The fuel cell of claim 1, wherein the aqueous electrolyte comprises a member selected from the group consisting of LiOH, NaOH, KOH, RbOH, CsOH, $Mg(OH)_2$, $Ca(OH)_2$, $Sr(OH)_2$, and $Ba(OH)_2$, and mixtures thereof.

8. The fuel cell of claim 1, wherein:
   the fluorinated solvent is selected from the group consisting of $(CnF_{2n+1})Si(QCH_3)_3$; $(CnF_{2n+1})_2Si(OCH_3)_2$; $(CnF_{2n+1})CH_2OC(Q)CH_3$; $CF_3[OCF_2CF_2]_nOCF_3$; $CF_3[OCF_2CF_2]_nOCF_2Cl$; $CF_3[OCF_2CF_2]_nOCF_2Br$; $CF_3[OCF_2CF_2]_nCF_2H$; $CF_3[OCF_2CF_2]_nF$; $CF_3[OCF_2CF_2]_nCl$; $CF_3[OCF_2CF_2]_nBr$; $CF_3[OCF_2CF_2]_nH$; $CF_3CF_2[OCF_2CF_2]_nF$; $CF_3CF_2[OCF_2CF_2]_n$ Cl; $CF_3CF_2[OCF_2CF_2]_nBr$; $CF_3CF_2[OCF_2CF_2]_nH$; $CF_3CHF[OCF_2CF_2]_nF$; $CF_3CHF[OCF_2CF_2]_nCl$; $CF_3CHF[OCF_2CF_2]_nBr$; $CF_3CHF[OCF_2CF_2]_nH$; $CF_3CHF[OCF_2CF(CF_3)_nF$; $(CF_3)_2CF(CF_2)_nF$; $(CF_3)_2CF(CF_2)_nCl$; $(CF_3)_2CFO(CF_2)_nBr$; $(CF_3)_2CFO(CF_2)_nH$; $(CF_3)_2CFO(CF_2)_nF$; $(CF_3)_2CFO(CF_2)_nCl$; $(CF_3)_2CFO(CF_2)_nBr$; $(CF_3)_2CFO(CF_2)_nH$; $C_nF_{2n+2}$; $CF_3(CF_2)_nCl$; $CF_3(CF_2)_nHCF_3(CF_2)_nBr$; $N(C_nF_{2n+1})_3$; $C_6F_mH_{6-m}$; $C_6F_mCl_{6+m}$; $C_6F_mBr_{6-m}$; $C_6F_m(CF_3)_{6-m}$; and mixtures thereof;

wherein n is 1 to 20; and wherein m is 1 to 6.

9. The fuel cell of claim 1, wherein the fluorinated solvent is selected from the group consisting of $CF_3(CF_2)_7Br$; $(CF_3)_2CF(CF_2)_4Cl$;

$(CF_3)_2CFO(CF_2)_6F$; perfluorobutyltetrahydrofuran; perfluoropropyltetrahydropyran;

$C_8F_{18}$; $CF_3CFBrCF_2Br$; $(CF_3)_2CF(CF_2)_4Br$; $[(CF_3)_2CFOCF_2CF_2]_2$; $C_9F_{20}$; $C_6F_6$; $CF_3CHF[OCF_2CF(CF_3)]_3F$; $(CF_3)_2CF(CF_2)_6Cl$; $C_{10}F_{16}$; $CF_3CHF[OCF_2CF(CF_3)]_4F$;

perfluorotetrahydrodicyclopentadiene; $[(CF_3)_2CFO(CF_2)_4]_2$; perfluorodecalin;

$CF_3CHF[OCF_2CF(CF_3)]_5F$; perfluorodimethyladamantane; $N(C_4F_9)_3$;

perfluoromethyldecalin; $C_6H_4(CF_3)_2$; and $CF_3CHF[OCF_2CF(CF_3)]_9F$; and mixtures thereof.

10. The fuel cell of claim 1, wherein the fluorinated solvent is perfluorodecaline.

11. The fuel cell of claim 1, wherein the surfactant is selected from the group consisting of: $F(CF_2CF_2)_y(CH_2CH_2O)_xH$, wherein y is 1 to 10, and x is 0 to 25; $((F(CF_2CF_2)_xCH_2CH_2)_xP(O)(ONH_4)_y$, wherein x is 1 or 2, y is 1 or 2, x+y is 3, and z is 1 to 8; $F(CF_2CF_2)_x CH_2CH_2SCH_2CH_2CO_2Li$, wherein x is 1 to 10; $F(CF_2CF_2)_x CH_2CH_2SO_3Y$, wherein x is 1 to 10, and Y is H or $NH_4$; and mixtures thereof.

12. The fuel cell of claim 1, wherein the surfactant is a mixture of $CF_3(CF_2)_5CH_2CH_2SO_3H$ and $CF_3(CF_2)_5 CH_2CH_2SO_3NH_4$.

13. The fuel cell of claim 1, wherein the volume-to-volume ratio of fluorinated solvent to aqueous electrolyte in the emulsion is from 1:24 to 24:1.

14. The fuel cell of claim 1, wherein the volume-to-volume ratio of fluorinated solvent to aqueous electrolyte in the emulsion is from 3:24 to 12:24.

15. The fuel cell of claim 1, wherein the volume-to-volume ratio of fluorinated solvent to aqueous electrolyte in the emulsion is from 1:6 to 5:7.

16. The fuel cell of claim 1, wherein the volume-to-volume ratio of fluorinated solvent to aqueous electrolyte in the emulsion is from 2:9 to 4:9.

17. The fuel cell of claim 1, wherein the amount of surfactant in the emulsion is from 0.07% to 30% of the total weight of the emulsion.

18. The fuel cell of claim 1, wherein the amount of surfactant in the emulsion is from 0.125% to 20% of the total weight of the emulsion.

19. The fuel cell of claim 1, wherein the amount of surfactant in the emulsion is from 0.5% to 1% of the total weight of the emulsion.

20. The fuel cell of claim 1, wherein the fuel cell is a fuel cell wherein the cathode and the anode are separated by a membrane.

21. The fuel cell of claim 1, wherein the anode and the cathode are separated by a channel contiguous with at least a portion of each electrode; such that when a first liquid is contacted with the anode, a second liquid is contacted with the cathode, and the first and the second liquids flow through the channel, laminar flow is established in the first and the second liquids.

22. A fuel cell of claim 1, wherein the emulsion in contact with the anode further comprises a fuel.

23. A fuel cell of claim 1, wherein the emulsion in contact with the cathode further comprises oxygen.

* * * * *

UNITED STATES PATENT AND TRADEMARK OFFICE
CERTIFICATE OF CORRECTION

PATENT NO. : 7,205,064 B2
APPLICATION NO. : 10/608815
DATED : April 17, 2007
INVENTOR(S) : Larry J. Markoski et al.

It is certified that error appears in the above-identified patent and that said Letters Patent is hereby corrected as shown below:

Col. 6, Claim 8, line 3, please delete "$(CnF_{2n+1})Si(QCH_3)_3; (CnF_{2n+1})_2Si(OCH_3)_2;$" and insert --$(C_nF_{2n+1})Si(OCH_3)_3; (C_nF_{2n+1})_2Si(OCH_3)_2;$--.
Col. 6, Claim 8, line 4, please delete "$(CnF_{2n+1})CH_2OC(Q)CH_3$" and insert --$(C_nF_{2n+1})CH_2OC(O)CH_3$--.
Claim 11, line 4, please delete "$((F(CF_2CF_2)_yCH_2CH_2)_xP(O)(ONH_4)_y$" and insert --$((F(CF_2CF_2)_zCH_2CH_2)_xP(O)(ONH_4)_y$--.
Col. 7, Claim 12, line 3, please delete "$CH_2CH_2SO_3N H_4$" and insert --$CH_2CH_2SO_3NH_4$--.
Col. 8, Claim 17, line 2, please delete "30%" and insert --3%--.
Col. 8, Claim 18, line 2, please delete "20%" and insert --2%--.

Signed and Sealed this

Twentieth Day of November, 2007

JON W. DUDAS
*Director of the United States Patent and Trademark Office*